United States Patent [19]

Mahdjuri-Sabet

[11] Patent Number: 5,667,003
[45] Date of Patent: Sep. 16, 1997

[54] HEAT PIPE DEVICE

[76] Inventor: Faramarz Mahdjuri-Sabet, Thermomax Limited, Balloo Crescent, Bangor, Great Britain, BT19 2UP

[21] Appl. No.: 453,675
[22] Filed: May 30, 1995

Related U.S. Application Data

[63] Continuation of Ser. No. 133,131, filed as PCT/GB92/00701 Apr. 16, 1992, publishded as WO92/18820 Oct. 29, 1992, abandoned.

[30] Foreign Application Priority Data

Apr. 17, 1991 [GB] United Kingdom .................. 9108229

[51] Int. Cl.⁶ ...................................................... F28D 15/00
[52] U.S. Cl. ........................................... 165/274; 165/300
[58] Field of Search ................................. 165/32, 32 H, 165/32 HV, 40; 126/589, 599

[56] References Cited

FOREIGN PATENT DOCUMENTS 0104092  6/1982  Japan .................... 165/32 H

*Primary Examiner*—John Fox
*Attorney, Agent, or Firm*—Watson Cole Stevens Davis, P.L.L.C.

[57] ABSTRACT

A heat pipe (1) containing a working fluid, comprises an evaporator (3), a condenser (2), an aperture (16) interconnecting the evaporator and the condenser, and a regulating means (13, 14) for limiting the maximum temperature in the condenser to a predetermined temperature. The regulating means comprises a plug (13) operable by means of a temperature sensitive member (14) to move between a first position in which the aperture is open and a second position in which the plug covers the aperture to restrict the flow of working fluid from the condenser to the evaporator. The working fluid then collects in the condenser and acts on the plug to further restrict the flow of working fluid from the condenser to the evaporator.

13 Claims, 4 Drawing Sheets

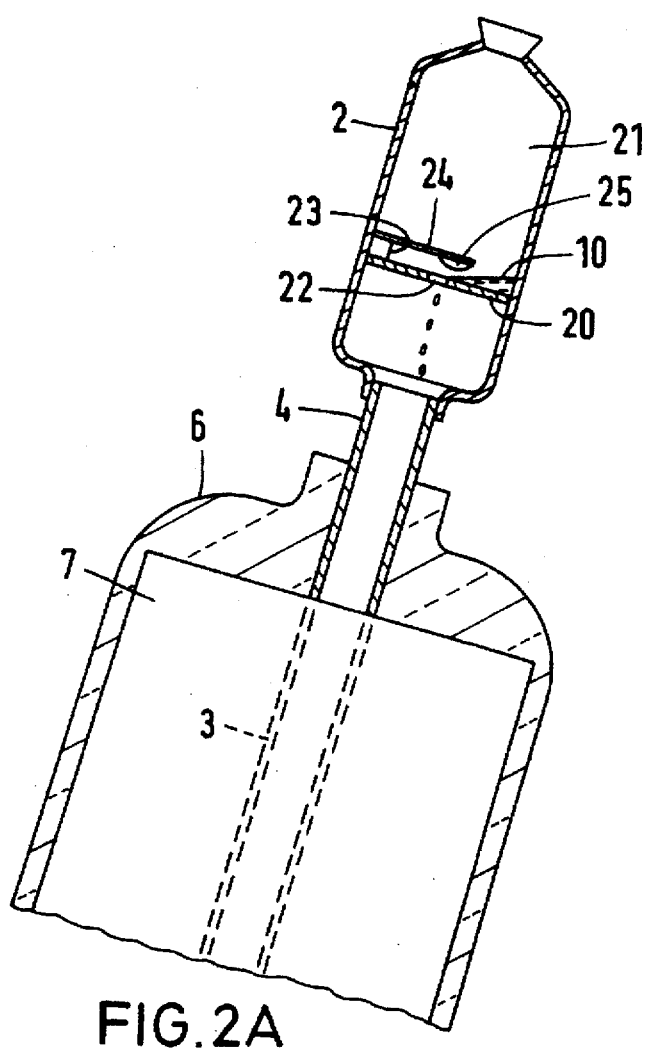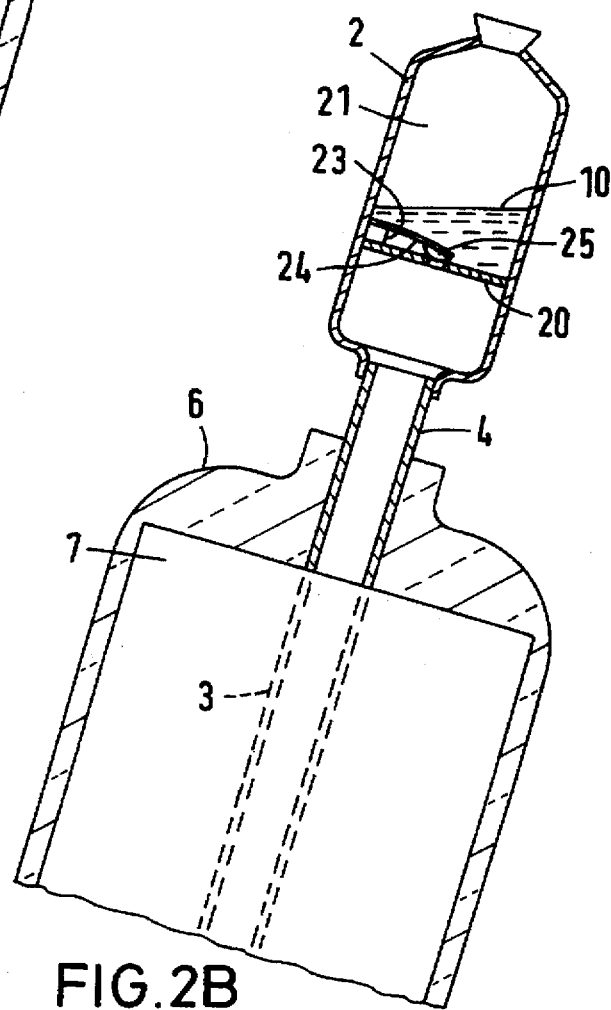

HEAT PIPE DEVICE

CROSS REFERENCE TO RELATED APPLICATION

This application is a continuation of application Ser. No. 08/133,131, filed as PCT/GB92/00701 Apr. 16, 1992, published as WO92/18820 Oct. 29, 1992, now abandoned.

BACKGROUND OF THE INVENTION

This invention relates in general to a heat pipe device, and in particular to such a device for use in solar radiation collectors.

A heat pipe transfers and distributes heat by vaporisation and condensation of a working fluid which is employed as a heat transfer medium. A principal feature of a heat pipe is that the energy required for the flow of the liquid and the vapour in the device, in the presence of gravity, is completely provided by the heat source, so that no external pumping means is needed.

Solar radiation collectors are intended to convert solar radiation into heat in the working fluid and to transfer the heat, with the maximum possible efficiency, to a secondary heat transfer fluid, which may be water or air, for example. The use of heat pipes in solar collectors is already known from my British patent number 2023804 and from my British Patent application number 2023803, for example.

A heat pipe conventionally comprises an evaporator element and a condenser element interconnected by means of a conduit, the condenser being placed in use above the evaporator. When the device is cool the working fluid collects in the base of the evaporator. When heat is supplied to the evaporator, the working fluid begins to vaporise and moves up into the condenser, where the heat is removed from the vapour, the vapour then condenses and falls back into the evaporator under the force of gravity.

The heat is usually removed from the vapour by positioning the condenser in a manifold through which heat transferring fluids are passed. It is desirable to provide efficient heat transfer from the condenser to the heat transferring fluid circulating through the manifold and to have a small thermal resistance between the condenser and the heat transferring fluid. The condenser should be designed to be appropriate to the output of the heat pipe.

Preferably, a solar radiation collector should be easily assembled from its component parts, and the parts should be easily replaceable.

If heat is not removed from the condenser, or it is not removed at a high enough rate, the condenser will overheat and the device or system may be damaged. Safety measures therefore have to be included in the device or system to prevent this. It is desirable to devise a means whereby the maximum temperature of the condenser may be limited to a chosen temperature $T_o$. This can be achieved if the working fluid is collected in the condenser compartment when the condenser reaches the limiting temperature $T_o$, rather than allowing the fluid to return to the evaporator. As a consequence, if heat continues to be applied to the evaporator, it gradually dries out and all the working fluid is held in the condenser, so that heat transfer between the evaporator and the condenser is interrupted.

International Patent Application number WO87/07003 describes a heat pipe in which, during normal operation, the condensed working fluid is drained or diverted back into the evaporator to continue the cycle of heat transfer, but if the condenser temperature goes above $T_o$, regulating means are provided for collecting the condensed working fluid in a chamber whereby the fluid cannot return to the evaporator. The regulating means comprises a valve controlled by a means made from a shape memory alloy, the alloy being arranged to alter its shape when it reaches the limiting temperature $T_o$.

The regulating means of WO87/07003 requires a relatively large force to operate the valve in order to guarantee a proper seal when the valve is in its closed position. Furthermore, the valve needs to be precisely machined and fitted to ensure a good seal, and the sealing surfaces may be susceptible to damage during use. Thus a heat pipe employing this regulating means is difficult and expensive to produce.

SUMMARY OF THE INVENTION

According to the present invention there is provided a heat pipe containing a working fluid, the heat pipe comprising an evaporator, a condenser, an aperture interconnecting the evaporator and the condenser, and a regulating means for limiting the maximum temperature in the condenser to a predetermined temperature, the regulating means comprising a plug operable by means of a temperature-sensitive member to move between a first position in which the aperture is open and a second position in which the plug covers the aperture to restrict the flow of the working fluid from the condenser to the evaporator such that the working fluid collects in the condenser, and such that the vapourised working fluid further restricts flow of the working fluid from the condenser to the evaporator.

Preferably, the pressure of the vapourised working fluid allows it to lift the plug and to pass through the restricted aperture from the evaporator to the condenser, the passage of the vapourised fluid through the restricted aperture pushing back the working fluid collected around the aperture in the condenser to further restrict the flow of the working fluid from the condenser to the evaporator. Furthermore, any fluid which does leak through will rapidly evaporate and push the fluid back around the plug. Accordingly, it is not necessary to have a highly reliable seal between the plug and the aperture, and a relatively inexpensive device can be used.

The temperature-sensitive member is preferably made from a bimetal or a shape memory alloy.

According to one aspect of the invention the plug is supported at one end of a flexible bimetal strip, the other end of the strip being fixedly supported within the condenser. The bimetal strip may be arranged to move the plug either axially or radially between the first position and the second position.

Alternatively, the plug may be attached to or integral with an axially-slidable bar, the temperature sensitive member being in the form of a helical spring which acts on the plug and the bar to move the plug between the first position and the second position. An additional biassing member, such as a helical spring, may be provided to reposition the plug to its first position when the temperature-sensitive member reverts to its original setting.

The heat pipe of the present invention is preferably used in a solar radiation collector having an absorption apparatus fitted around the evaporator and a secondary fluid circuit for removing the heat from the condenser.

BRIEF DESCRIPTION OF THE DRAWING

A number of embodiments of the present invention will now be described by way of example with reference to the accompanying drawings, in which:

FIGS. 2A and 3A show further embodiments of a heat pipe in the configuration required when the temperature of the condenser is below the predetermined maximum temperature $T_o$;

FIG. 2B and 3B show the heat pipe of FIGS. 2A and 3A respectively in the configuration required when the condenser temperature is greater than temperature $T_o$;

DETAILED DESCRIPTION OF THE PREFERRED EMBODIMENT

Figures 1A, 1B:
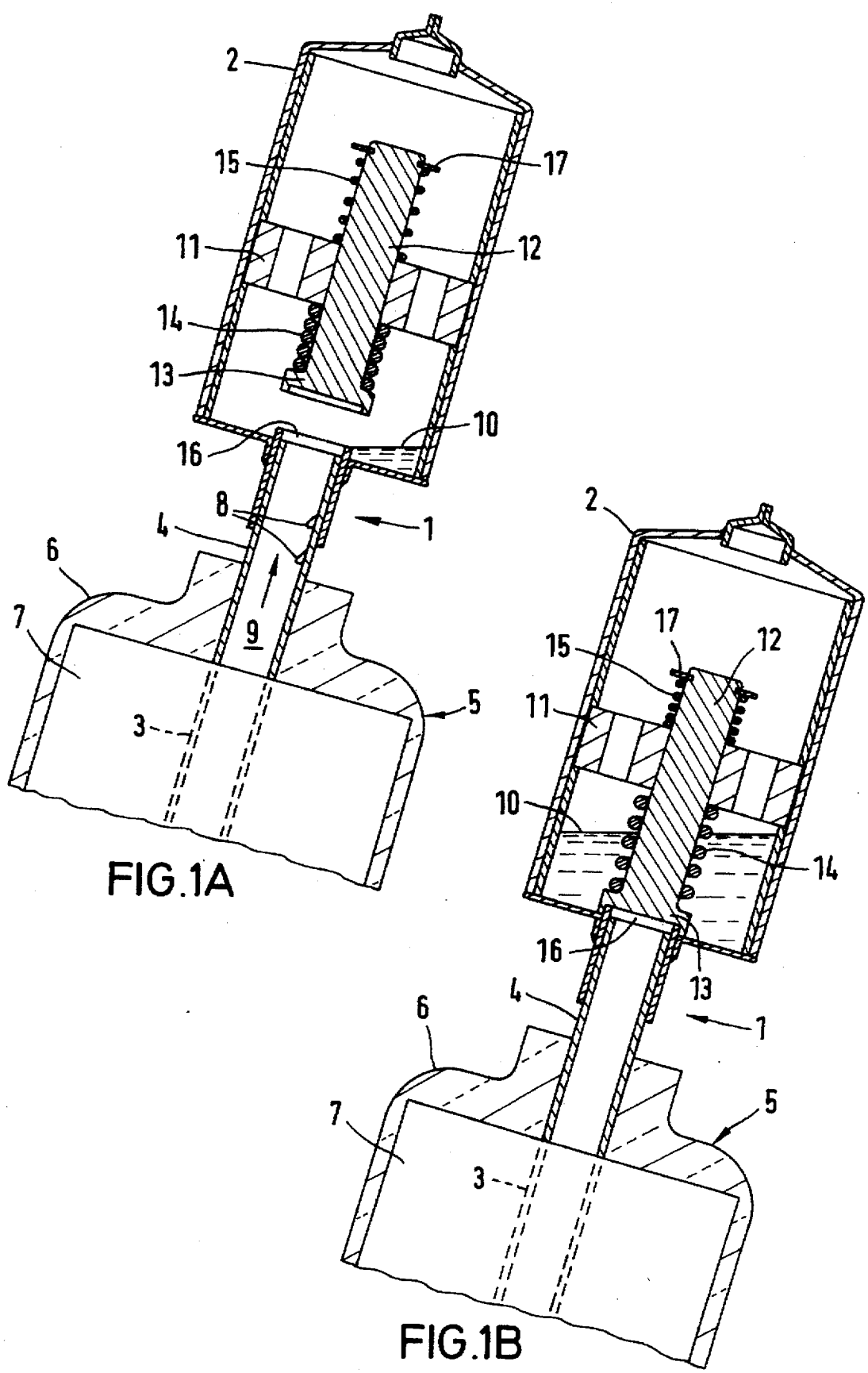
FIG. 1A shows one embodiment of a heat pipe employed in a solar radiation collector in the configuration required when the temperature of the condenser is below the predetermined maximum temperature $T_o$.
FIG. 1B shows the heat pipe of FIG. 1A in the configuration required when the condenser temperature is greater than temperature $T_o$.

Referring first to FIGS. 1A and 1B, the heat pipe 1 contains a working fluid 10 and comprises a condenser 2, an evaporator 3 and an interconnecting conduit or tube 4 which joins the evaporator and the condenser, (only the top portion of the evaporator is shown in FIGS. 1A and 1B). When used in a solar radiation collector, the evaporator 3 is provided with absorption apparatus 5, preferably of planar configuration, comprising a transparent jacket 6 such as a glass tube, the space 7 between the jacket and the evaporator preferably being evacuated to reduce conduction heat loss. The jacket may be provided with radiation-absorbing fins (not shown), and is bonded to and in thermal contact with the evaporator which is formed from a closed-ended metal tube. The absorption apparatus preferably has low heat radiation properties.

In use, when the sun does not shine, the working fluid collects in the closed bottom end portion of the evaporator. Then, when the sun shines, the entire plate of the absorption apparatus and thus also the evaporator will be heated. The working fluid which is in the bottom end portion of the evaporator begins to vaporise and rises through the tube 4 in the direction of arrow 9 and into the condenser 2. The vapour transfers its heat to the condenser due to the condensation process, since the condenser is adapted to be received in a manifold (not shown) wherein a heat-transferring fluid such as air or water is caused to flow. The exterior of the condenser is thus in direct contact with the heat-transferring fluid in the manifold. The droplets 8 of condensed working fluid then fall back down the tube 4 and into the evaporator 3 to repeat the process.

As a result of the vacuum between the evaporator and the jacket and of the low heat radiation properties of the absorption apparatus, the heat losses of the solar radiation collector would be very low, and the temperature of the absorption apparatus might exceed 200° C. or even higher temperatures. Usually such a solar radiation collector would be used to produce a maximum usable temperature of up to 100° C. If the energy is not consumed, due to failure of the manifold circulating pump or too low heat consumption in the system (e.g. when no hot water is required), the temperature in the condenser may well exceed the desired 100° C. maximum temperature limit, or any other predetermined maximum temperature. In order to prevent any overheating and possible damage to or destruction of the condenser or the entire system, safety means have to be provided to limit the maximum temperature of the condenser.

Such a safety means is provided in the condenser as shown in the drawing. A supporting bracket 11 is mounted within the condenser 2 and a rod 12 is fitted to slide axially within the supporting bracket. A plug 13 is fixed to or integral within one end of the rod 12. The tube 4 connecting the evaporator and the condenser forms an aperture 16 in the condenser. When the temperature of the condenser is below the preselected temperature $T_o$ (as shown in FIG. 1A), the rod and plug are supported in the bracket with a gap between the plug 13 and the aperture 16, so that the aperture provides an open drain hole. With the plug in this position, the condensed working fluid will return through the connecting tube 4 and down into the evaporator to continue the heat transfer process.

A helical spring 14 made of shape memory alloy, for example, is positioned on the rod 12 and between the supporting bracket 11 and the plug 13. When the temperature of the condenser reaches $T_o$, the helical spring 14 moves the plug downwards towards the base of the condenser until it covers the aperture 16 as shown in FIG. 1B.

An additional helical compression spring 15 is provided between the supporting bracket and a projection 17 at the opposite end of the rod to the plug. The additional spring 15 resets the position of the plug when the temperature of the condenser falls below $T_o$ once more, and holds the plug away from the aperture all the while the temperature remains below $T_o$.

The helical shape memory alloy spring 14 may be replaced by any other suitable temperature-sensitive device such as a bimetal or a magnetic coupling actuated from outside the condenser. As the condenser temperature increases, a bimetal temperature-sensitive device will gradually move the plug closer to the aperture until, when the preselected temperature $T_o$ is reached, the aperture is covered by the plug. If a shape memory alloy spring is used, when temperature $T_o$ is reached, the plug moves rapidly to cover the aperture.

Once temperature $T_o$ is reached and the plug covers the aperture, the condensed working fluid can no longer return readily to the evaporator. However, the remaining working fluid in the evaporator continues to vaporise, and the increased pressure in the evaporator presses the plug away from the aperture 16 and allows vapour to escape into the condenser. As the vapour passes around the plug into the condenser, it pushes back the fluid already held in the condenser so that there is little leakage of the fluid back into the evaporator. Furthermore, any fluid which does leak through will rapidly evaporate and push the fluid back around the plug. Accordingly, it is not necessary to have a highly reliable seal between the plug and the aperture, and a relatively inexpensive device can be used.

As the working fluid collects in the condenser it acts on the plug to improve the seal between the evaporator and the condenser and further restrict any leakage of working fluid from the condenser to the evaporator.

Clearly, the condenser should have sufficient capacity to contain all the working fluid within the heat pipe.

The alternative embodiments of the invention shown in FIGS. 2A to 4B only differ from the embodiment of FIGS. 1A and 1B in respect of the temperature regulating means, and like numerals will therefore be used for like parts.

In the embodiment of FIGS. 2A and 2B, the condenser 2 is provided with a divider plate 20 which separates the upper condenser compartment 21 from the evaporator 3. The divider plate 20 has an aperture 22 therein. A supporting bracket 23 fitted to the divider plate supports one end of a temperature sensitive device 24, for example a bimetal strip. A plug 25 is fitted to the other end of the temperature-sensitive device. When the temperature of the condenser is less than $T_o$ the temperature-sensitive device 24 holds the plug 25 in the position shown in FIG. 2A, such that condensed working fluid can drain freely back into the evaporator. As the temperature increases until temperature $T_o$ is reached, the device 24 moves the plug substantially axially to cover the aperture 22 to restrict the flow of fluid from the condenser to the evaporator as shown in FIG. 2B.

As discussed above, the vapour from the remaining working fluid in the evaporator builds up and presses the plug back to allow the vapour to escape into the condenser compartment 21. This arrangement ensures that a highly effective seal between the plug 25 and the aperture 22 is not required, and once again the build up of fluid in the condenser compartment increases the effectiveness of the seal and further restricts the flow of fluid from the condenser to the evaporator.

Figure 3A:
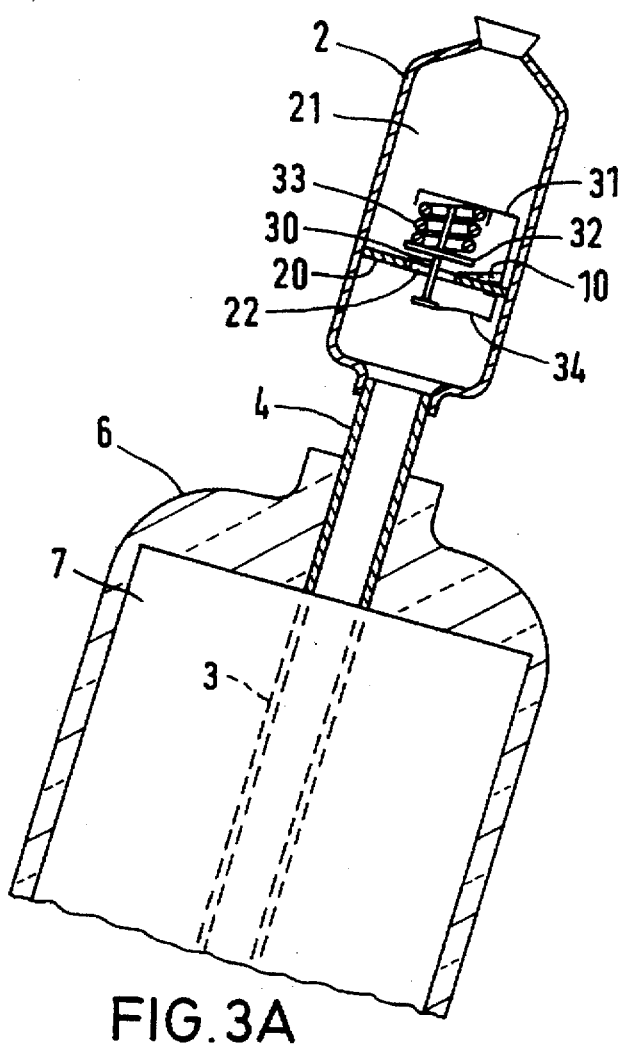
Figure 3B:
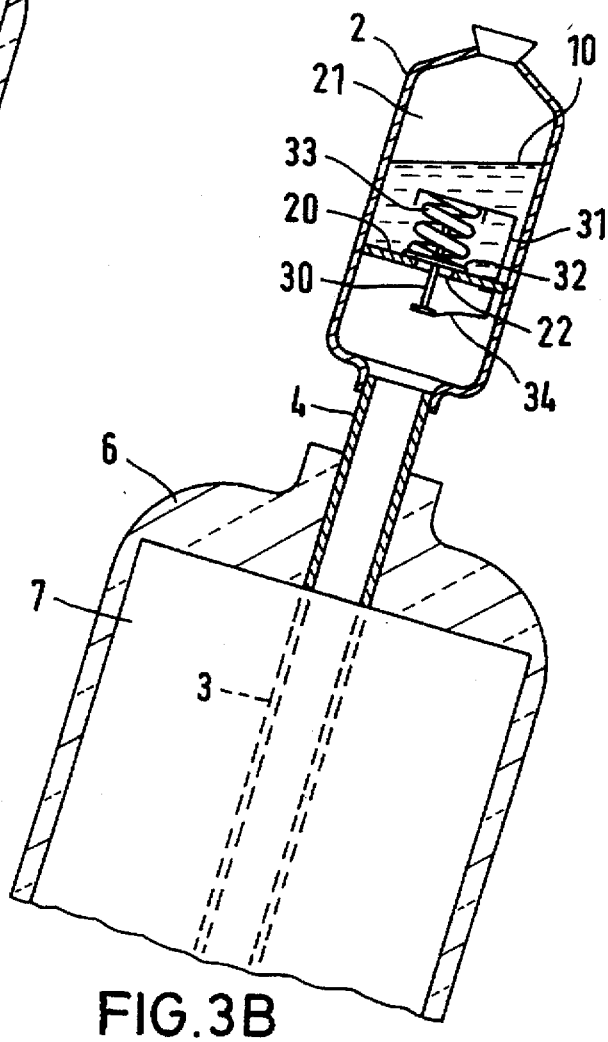

The embodiment of FIGS. 3A and 3B also employs a divider plate 20 in the condenser, the plate having an aperture 22. A rod 30 is held by a supporting bracket 31 for axial movement within the aperture. A plug 32 is fitted to or integral with the middle portion of the rod 30 and a helical shape memory alloy spring 33 is positioned between the plug and the supporting bracket. An additional resetting biassing means 34 is attached to one end of the rod.

When the temperature of the condenser compartment is below $T_o$, the plug is held in the position shown in FIG. 3A by means of the biassing means 34 and condensed working fluid can flow back into the evaporator. Once temperature $T_o$ is reached, the helical spring 33 moves the plug 32 to cover the aperture 22 (as shown in FIG. 3B) and to restrict the flow of working fluid from the condenser to the evaporator.

Figure 4A:
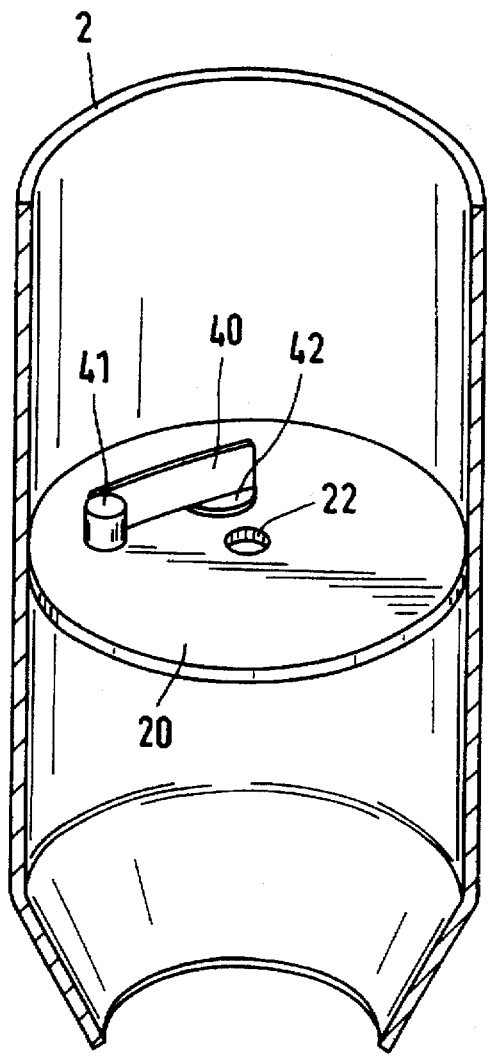
FIG. 4A shows a perspective view of a condenser for a further embodiment of a heat pipe when the temperature of the condenser is below the predetermined maximum temperature $T_o$.
Figure 4B:
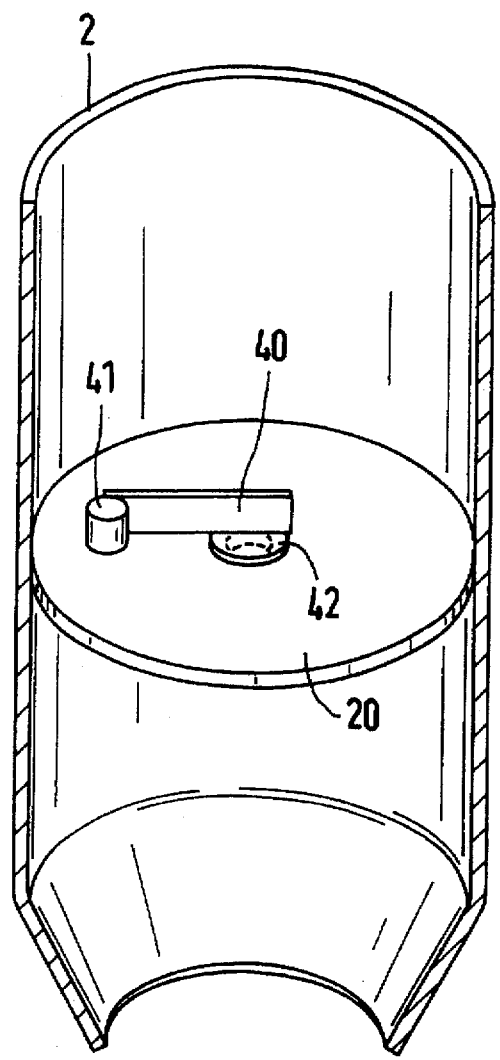
FIG. 4B shows the condenser of FIG. 4A in the configuration required when the condenser temperature is greater than temperature $T_o$.

FIGS. 4A and 4B show a condenser similar to that shown in FIGS. 2A and 2B. A temperature-sensitive strip 40 is supported at one end by a peg 41 on the divider plate 20, and a plug 42 is fitted to the other end of the strip. When the temperature is below $T_o$, the strip holds the plug in the position shown in FIG. 4A and the aperture 22 is open. When the temperature reaches $T_o$, the strip reacts and moves the plug 42 substantially radially to cover the aperture.

In each of the above-described embodiments, once the temperature of the condenser drops below $T_o$ again, the temperature-sensitive device moves the plug to open the aperture and allow the working fluid to return to the evaporator to activate full heat transfer once more.

I claim:

1. A heat pipe containing a working fluid and comprising an evaporator, a condenser positioned above the evaporator and including a bottom wall, a tube means which extends from said evaporator throuqh said bottom wall and said condenser to define an aperature in said condenser, and a regulating means for limiting the maximum temperature in the condenser to a predetermined temperature, said regulating means comprising a plug means operable by means of a temperature-sensitive member for movement between a first position in which the aperture is open and a second position wherein the plug means restricts said aperture to limit the flow of the working fluid from the condenser to the evaporator such that the working fluid collects in the condenser and such that the passage of the vaporized working fluid from the evaporator to the condenser through the restricted aperture further limits the flow of the working fluid from the condenser to the evaporator, but provides leakage of the working fluid back into the evaporator.

2. A heat pipe according to claim 1, wherein the plug means is supported on a flexible strip.

3. A heat pipe according to claim 2, wherein the flexible strip comprises the temperature sensitive member.

4. A heat pipe according to claim 1, wherein said plug means is supported on an axially slidable rod.

5. A heat pipe according to claim 4, wherein said condenser includes a supporting bracket through which said rod is axially slidable.

6. A heat pipe according to claim 5, wherein the temperature sensitive member is in the form of a helical spring which is positioned between said supporting bracket and said plug means.

7. A heat pipe according to claim 6, wherein an additional biassing means is provided to reposition the plug means to its first position when the temperature sensitive member reverts to its original setting, said additional biassing means being positioned between said supporting bracket and a projection at an end of said rod opposite said plug means.

8. A heat pipe according to claim 1, wherein the temperature sensitive member is made from a bimetal.

9. A heat pipe according to claim 1, wherein the temperature sensitive member is made from a shape memory alloy.

10. A heat pipe according to claim 1, wherein the temperature sensitive member comprises a magnetic coupling actuated from outside the condenser.

11. A solar radiation collector including the heat pipe of claim 1 and having an absorption apparatus fitted around the evaporator and a secondary fluid circuit for removing the heat from the condenser.

12. A heat pipe which contains a vaporizable working fluid and which comprises a condenser in which said working fluid can condense and which includes a bottom wall; an evaporator in which said working fluid can vaporize with application of heat, said evaporator being located beneath said condenser; a tube means which extends from said evaporator up through said bottom wall and into said condenser to define an aperture in said condenser, and a temperature-regulating means located in said condenser for limiting the temperature in the condenser to a predetermined maximum, said regulating means comprising a plug means and a temperature-sensitive member for moving said plug means between a first position spaced from said aperture and a second position covering said aperture, said plug means, when in said first position, functioning to allow unrestricted drainage of condensed working fluid from said condenser through said aperture into said evaporator, and when in said second position, functioning to restrict drainage of condensed working fluid from said condenser through said aperture into said evaporator and cause accumulation of condensed working fluid around said aperture.

13. A heat pipe according to claim 12, wherein said condenser includes a supporting bracket therein and including a rod to which said plug means is attached, said rod being axially movable through said supporting bracket to move said plug means between said first and second positions.

* * * * *